US010019763B2

(12) United States Patent
Dopf et al.

(10) Patent No.: US 10,019,763 B2
(45) Date of Patent: Jul. 10, 2018

(54) EXTENSION LEDGER

(71) Applicant: SAP SE, Walldorf (DE)

(72) Inventors: Georg Dopf, Schwetzingen (DE); Michael Conrad, Oftersheim (DE); Stefan Gauger, Heidelberg (DE); Joachim Kenntner, Heidelberg (DE); Joachim Liebler, Heidelberg (DE); Ruediger Raubeck, St. Leon-Rot (DE); Andreas Reccius, Walldorf (DE); Thomas Schachner, Heidelberg (DE); Thomas Schneider, Heidelberg (DE); Radim Sykora, Nussloch (DE)

(73) Assignee: SAP SE, Walldorf (DE)

( * ) Notice: Subject to any disclaimer, the term of this patent is extended or adjusted under 35 U.S.C. 154(b) by 521 days.

(21) Appl. No.: 14/742,295

(22) Filed: Jun. 17, 2015

(65) Prior Publication Data
US 2016/0371790 A1  Dec. 22, 2016

(51) Int. Cl.
| | | |
|---|---|---|
| *G07B 17/00* | (2006.01) |
| *G07F 19/00* | (2006.01) |
| *G06Q 40/00* | (2012.01) |
| *G06F 17/30* | (2006.01) |
| *G06Q 40/02* | (2012.01) |
| *G06Q 20/00* | (2012.01) |
| *G06Q 10/06* | (2012.01) |

(Continued)

(52) U.S. Cl.
CPC ....... *G06Q 40/12* (2013.12); *G06F 17/30312* (2013.01); *G06Q 10/06* (2013.01); *G06Q 20/00* (2013.01); *G06Q 20/209* (2013.01); *G06Q 40/00* (2013.01); *G06Q 40/02* (2013.01); *G06Q 40/025* (2013.01); *G06Q 40/04* (2013.01)

(58) Field of Classification Search
CPC ...... G06Q 40/00; G06Q 20/209; G06Q 40/02; G06Q 40/12; G06Q 20/00; G06Q 10/06; G06Q 40/025; G06Q 40/04; G06F 3/048
USPC .................................. 705/30, 7.35, 38, 319
See application file for complete search history.

(56) References Cited

U.S. PATENT DOCUMENTS 6,532,450 B1 * 3/2003 Brown ................... G06Q 20/00
705/40
7,120,597 B1 * 10/2006 Knudtzon .............. G06Q 40/02
705/30

(Continued)

*Primary Examiner* — Olusegun Goyea
(74) *Attorney, Agent, or Firm* — Fountainhead Law Group P.C.

(57) ABSTRACT

A system stores financial accounting data in a Base ledger, together with overlying extension ledger(s). An engine receives both generic financial data, and financial data utilized for specific purposes. Utilizing a mapping table the engine stores in an underlying Base ledger, the generic financial data (e.g., a fixed asset acquisition). The engine stores in overlying extension ledgers, specific financial data (e.g., a linear asset depreciation and/or an declining balance method of asset depreciation) derived from that generic data. This reduces memory footprint by persisting the generic data in one location only. The stored data may be read utilizing dataviews combining data from Base and extension ledgers. A recursive algorithm may evaluate chain(s) of ledgers. Embodiments may be particularly suited to store in the Base ledger generic financial data common to multiple accounting principles (e.g., GAAP, IFRS), and store in extension ledger(s) the associated financial data specific to those accounting schemes.

18 Claims, 11 Drawing Sheets

(51) Int. Cl.
*G06Q 20/20* (2012.01)
*G06Q 40/04* (2012.01)

(56) References Cited

U.S. PATENT DOCUMENTS

| | | | | |
|---|---|---|---|---|
| 7,263,527 | B1* | 8/2007 | Malcolm | G06Q 30/02 705/30 |
| 8,001,020 | B2* | 8/2011 | Hahn | G06Q 20/209 705/24 |
| 2002/0010612 | A1* | 1/2002 | Smith | G06Q 10/06375 705/7.35 |
| 2002/0087441 | A1* | 7/2002 | Wagner, Jr. | G06Q 30/06 705/30 |
| 2003/0046194 | A1* | 3/2003 | McClendon, III | G06Q 40/02 705/30 |
| 2005/0137946 | A1* | 6/2005 | Schaub | G06Q 10/06 705/30 |
| 2009/0030819 | A1* | 1/2009 | VanLeeuwen | G06Q 40/00 705/30 |
| 2009/0313149 | A1* | 12/2009 | Hahn | G06Q 20/209 705/30 |
| 2014/0279384 | A1* | 9/2014 | Loevenich | G06Q 40/025 705/38 |
| 2017/0316499 | A1* | 11/2017 | Vollmert | G06Q 40/04 |

* cited by examiner

| Ledger | Type | Based on |
|--------|-----------|----------|
| A | Extension | B |
| B | Extension | C |
| C | Base | |
| D | Extension | C |

FIG. 5

| Ledger | Transaction_Data |
|--------|------------------|
| A | Record 1 |
| B | Record 2 |
| B | Record 3 |
| C | Record 4 |
| C | Record 5 |
| C | Record 6 |

FIG. 6

| Ledger | Transaction_Data |
|---|---|
| A | Record 1 |
| A | Record 2 |
| A | Record 3 |
| A | Record 4 |
| A | Record 5 |
| A | Record 6 |
| B | Record 2 |
| B | Record 3 |
| B | Record 4 |
| B | Record 5 |
| B | Record 6 |
| C | Record 4 |
| C | Record 5 |
| C | Record 6 |

FIG. 7

EXTENSION LEDGER

BACKGROUND

The disclosure relates to financial accounting software, and in particular, to a software program including an extension ledger feature.

Unless otherwise indicated herein, the approaches described in this section are not admitted to be prior art by inclusion in this section.

Today, business entities utilize software systems to manage accounting information. One component of such financial software systems is the ledger, which describes self-contained storage of financial data. An individual ledger typically has a special purpose, and provides a specific view on financial data.

Conventionally, such financial software may rely upon separate ledgers in order to fulfill particular requirements. One common example is where the financial data is to be processed according to different accounting principles (e.g. handling of multi-GAAP scenarios).

However, the effort of creating an entirely new ledger for the specific task (e.g., for each different accounting principle regime) may be time-consuming and costly. For example, the same generic data may be handled according to a number of different accounting principles applicable to particular global jurisdictions.

Moreover, in nearly all cases such special-purpose individual ledgers store redundant data. This undesirably increases the memory footprint, and leads to the need to reconcile data between the special-purposes ledgers. Both prospects again increase the cost of using the software.

SUMMARY

A system is configured to implement storage of financial accounting data in a Base ledger, together with overlying Extension ledger(s). An engine receives both generic financial data, and financial data utilized for specific purposes. Utilizing a mapping table the engine stores in an underlying Base ledger, the generic financial data (e.g., a fixed asset acquisition). The engine stores in an overlying Extension ledger the specific financial data (e.g., a linear asset depreciation and/or a declining balance method of asset depreciation) derived from that generic data. This reduces memory footprint by persisting the generic data in one location only. The stored data may be read utilizing dataviews combining data from Base and Extension ledgers. A logically recursive algorithm (which may be implemented on a database layer as a join) may evaluate chain(s) of ledgers. Embodiments may be particularly suited to store in the Base ledger generic financial data common to multiple accounting principles (e.g., GAAP, IFRS), and store in Extension ledger(s) the associated financial data specific to those accounting schemes.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings:

FIG. 5 is a simplified view illustrating the recursive definition of extension ledgers.

FIG. 6 is a simplified view illustrating transaction data according to an embodiment.

FIG. 7 is a simplified view illustrating a dataview providing a logical view to the transaction data.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

A system is configured to implement storage of financial accounting data in a Base ledger, together with overlying Extension ledger(s). An engine receives both generic financial data, and financial data utilized for specific purposes. Utilizing a mapping table the engine stores in an underlying Base ledger, the generic financial data (e.g. a fixed asset acquisition), and stores in an overlying Extension ledger the specific financial data (e.g., a linear asset depreciation and/or a declining balance method of asset depreciation) derived from that generic data. This reduces memory footprint by persisting the generic data in one location only. The stored data may be read utilizing dataviews combining data from Base and Extension ledgers. A recursive algorithm may evaluate chain(s) of ledgers. Embodiments may be particularly suited to store in the Base ledger generic financial data common to multiple accounting principles (e.g., GAAP, IFRS), and store in Extension ledger(s) the associated financial data specific to those accounting schemes.

Figure 1:
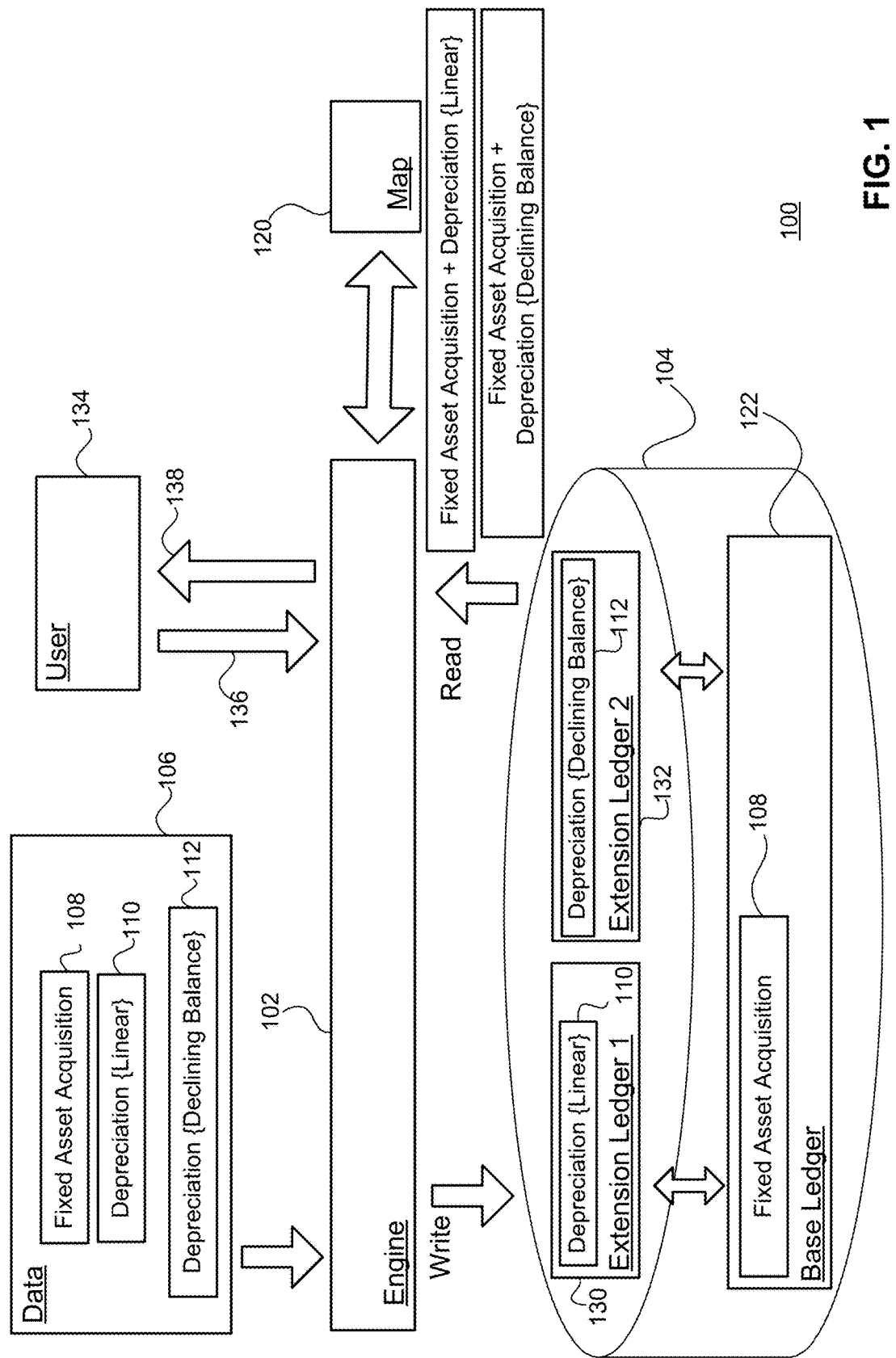
FIG. 1 is a simplified block diagram illustrating a system implementing an extension ledger according to an embodiment.

FIG. 1 is a simplified view of a system 100 implementing extension ledger(s) according to an embodiment. In particular engine 102 is in communication with a non-transitory-computer readable storage medium 104.

Engine 102 is configured to receive input in the form of various kinds of (financial) data 106. For example, this financial data may include a fixed asset acquisition value 108. For purposes of illustration only, consider as one example the $20,000 acquisition value of purchasing a new company car.

This fixed asset acquisition value may be received from an upstream financial accounting system configured according to multiple accounting principles. Here, a first accounting principle may be the Generally Accepted Accounting Principles (GAAP) embraced by the United States. A second accounting principle may be the International Financial Reporting Standards (IFRS) utilized in Europe.

The fixed asset acquisition value data may be treated significantly differently under GAAP versus IFRS. For example, GAAP may require the $20,000 company car to be depreciated declining balance method. As such, a declining balance method of depreciation value 110 of that fixed asset may also be associated with this $20,000 value.

Conversely, IFRS accounting principles may require the $20,000 company car to be depreciated linearly. As such, a linear depreciation value 112 of that fixed asset may also be associated with this $20,000 value.

The system seeks to store the input financial data in a manner that reduces redundancy and complexity. Accordingly, the engine references a map 120 in order to write the $20,000 acquisition value 108 common to both GAAP and IFRS in a base ledger 122.

The engine also references the map in order to write the linear depreciation value 110 in a first extension ledger 130 associated with data specific to GAAP. Conversely, the engine references the map to write the declining balance method of depreciation value 112 in a second extension ledger 132 associated with data specific to IFRS accounting principles.

Subsequently, a user 134 may issue instructions 136 to the engine seeking access to the financial data for reporting purposes. In response, the engine reads the relevant financial information from both the base ledger and the extension ledger(s).

Thus as shown here, the read operation may produce a report 138 comprising the $20,000 acquisition value associated linear depreciation. The read operation may also produce a report reflecting the $20,000 acquisition value together with the associated declining balance method of declining balance method of depreciation.

This financial reporting is able to occur with reduced memory footprint, owing to use of the extension ledger. That is, the $20,000 acquisition value is persisted in only one location (the Base ledger). The reference to a generic fixed asset acquisition value and associated linear and declining balance method of depreciation values in FIG. 1, represents only a single example. Embodiments are not limited to storing these or any other particular types of generic and associated specific financial data.

Figure 2:
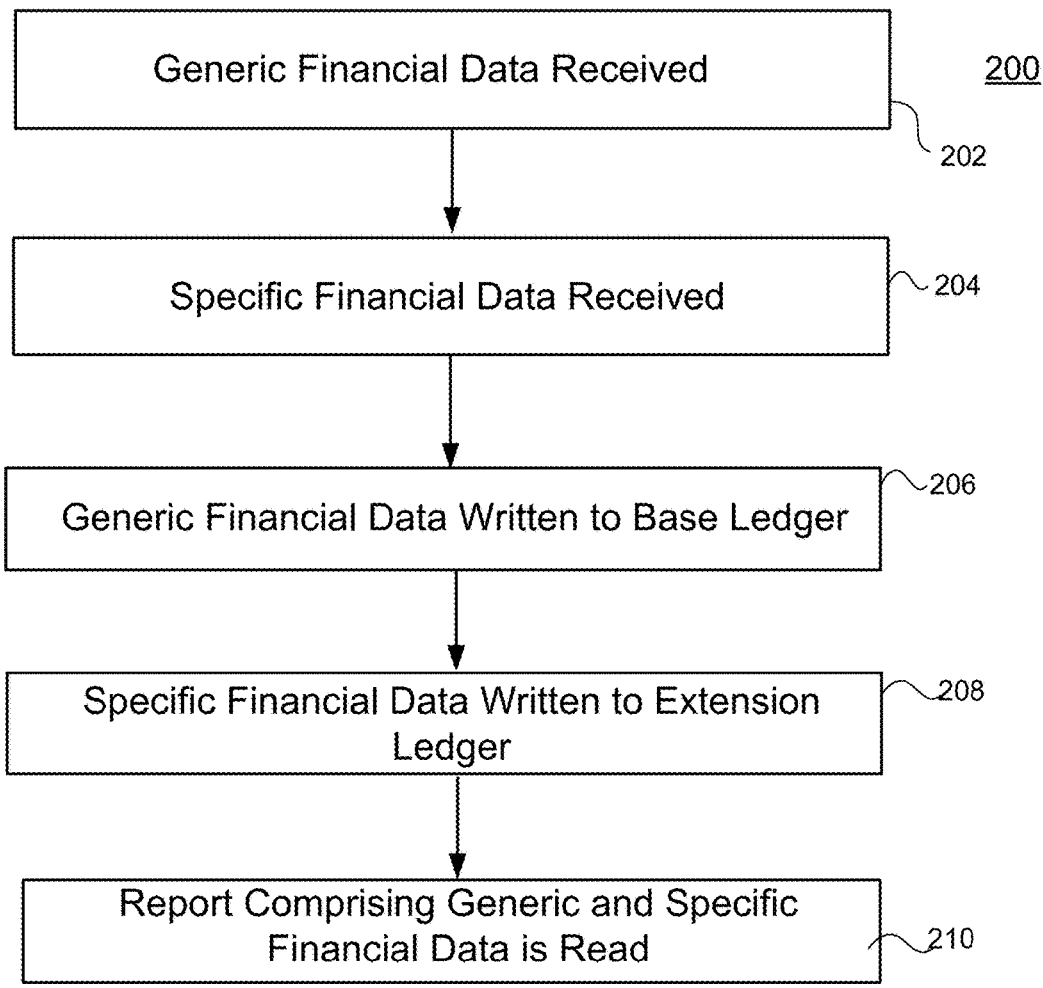
FIG. 2 is a simplified flow diagram illustrating a method according to an embodiment.

Accordingly, FIG. 2 offers a simplified flow diagram of method 200 according to an embodiment. In a first step 202 an engine receives generic financial data.

In a second step 202, the engine receives specific financial data associated with the generic financial data. In a third step 206 the engine writes the generic financial data to a base ledger.

In a fourth step 208 the engine writes the specific financial data to the extension ledger linked to the base ledger according to a mapping table. In a fifth step 210 the engine references the mapping table to read a report comprising both the generic financial data and the specific financial data.

Figure 3:
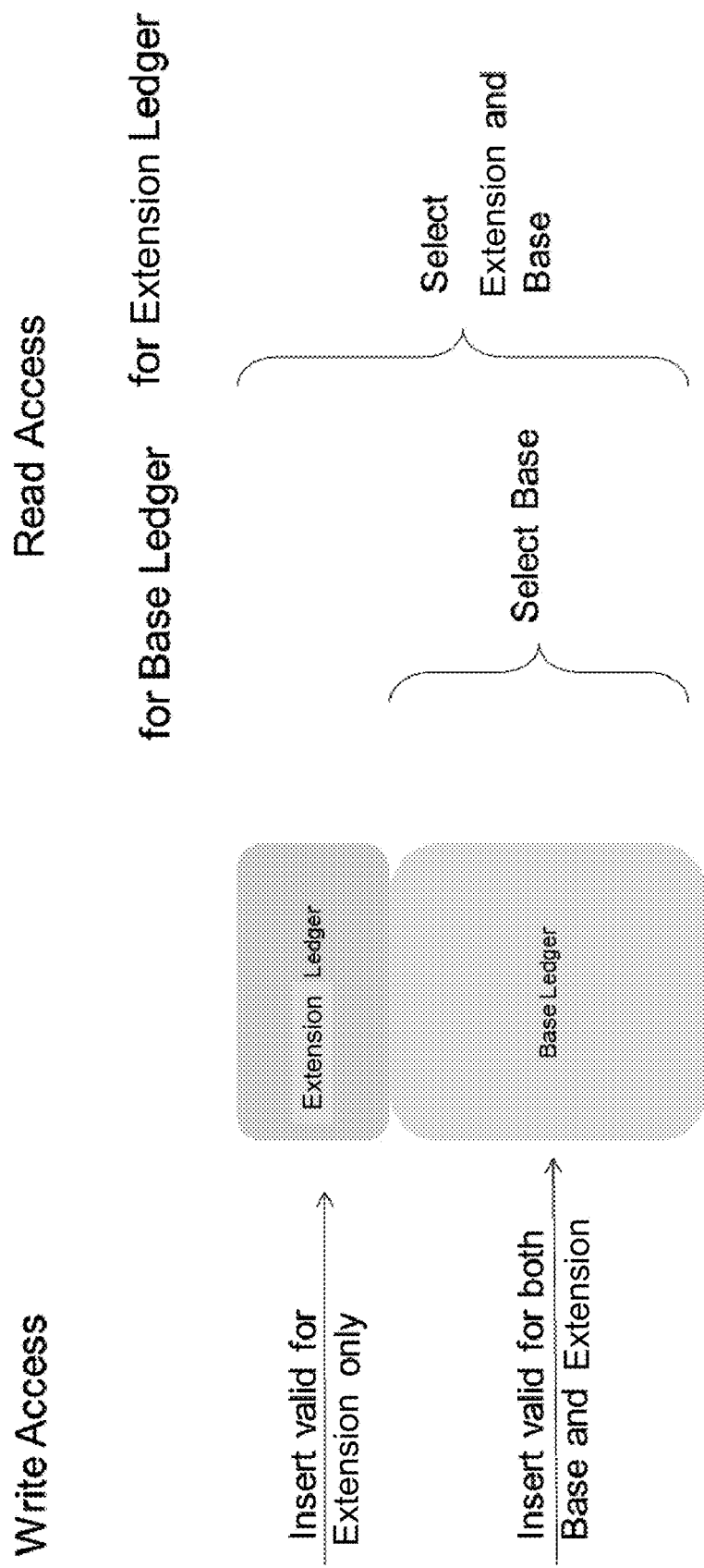
FIG. 3 illustrates an overview of write/read access utilizing a base ledger and an extension ledger.

Details regarding implementation of extension ledger(s) according to specific embodiments are now described. For example, FIG. 3 illustrates an overview of write and read access utilizing a general ledger and an extension ledger. By providing ledgers overlaid on top of each other, this mechanism provides flexibility in accessing stored financial information while minimizing the data footprint and allowing ready creation of additional views.

Figure 4:
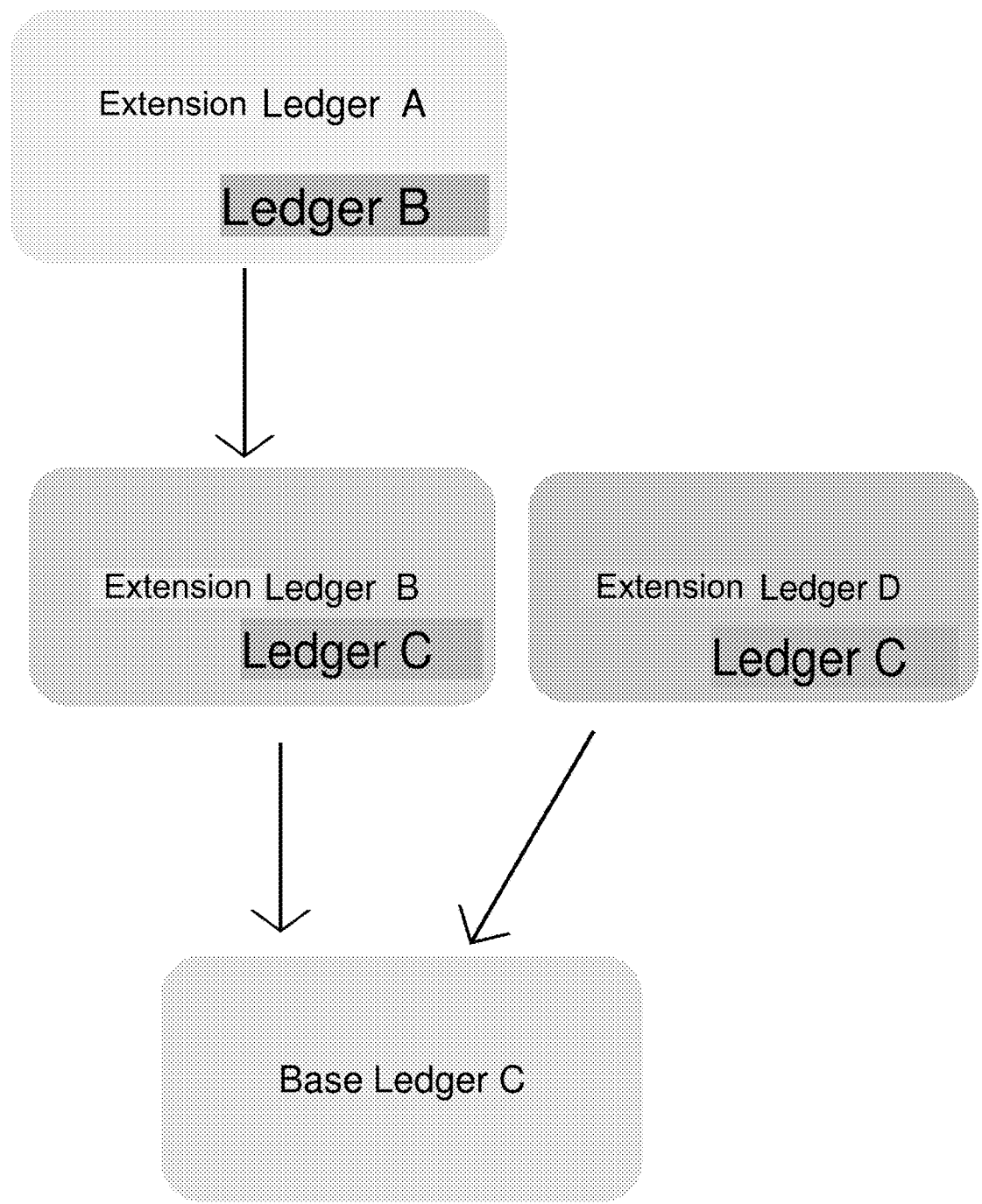
FIG. 4 is a simplified view illustrating ledger master data according to an embodiment.

FIG. 4 illustrates the recursive definition of extension ledgers. Here, the Extension ledger A refers to the Extension ledger B. The Extension ledger B refers to the Base ledger C. The Extension ledger D also refers to the Base ledger C.

As shown in this figure, embodiments allow creation of multiple extension ledgers. As further shown in this figure, embodiments also allow the stacking of such extension ledgers, which provides additional flexibility.

The ledger master defines the type of a ledger: Extension Ledger or Base Ledger. The respective ledger thus "knows" the ledger it refers to.

A recursive algorithm may be implemented in order to evaluate the chain of ledgers. Logically the final select to a particular ledger may always select with an "in clause" containing a list of ledgers lying below it.

FIG. 5 is a simplified view illustrating ledger master data according to an embodiment. This table contains relationship(s) between the various ledgers (e.g., base ledger and extension ledgers).

FIG. 6 is a simplified view illustrating transaction data according to an embodiment. Utilization of the extension ledger mechanism allows data to be persisted free of redundancy. That is, Records 4-6 are valid for all ledgers (e.g., the Base ledger, the $1^{st}$ Extension ledger, the $2^{nd}$ Extension ledger), but are persisted only once in the Base ledger.

FIG. 7 is a simplified view illustrating a dataview providing a logical view to the transaction data. In particular, the database views provide a complete view per ledger, including inherited records. This approach allows for central redefinition of the transaction table by the database view.

Figure 8:
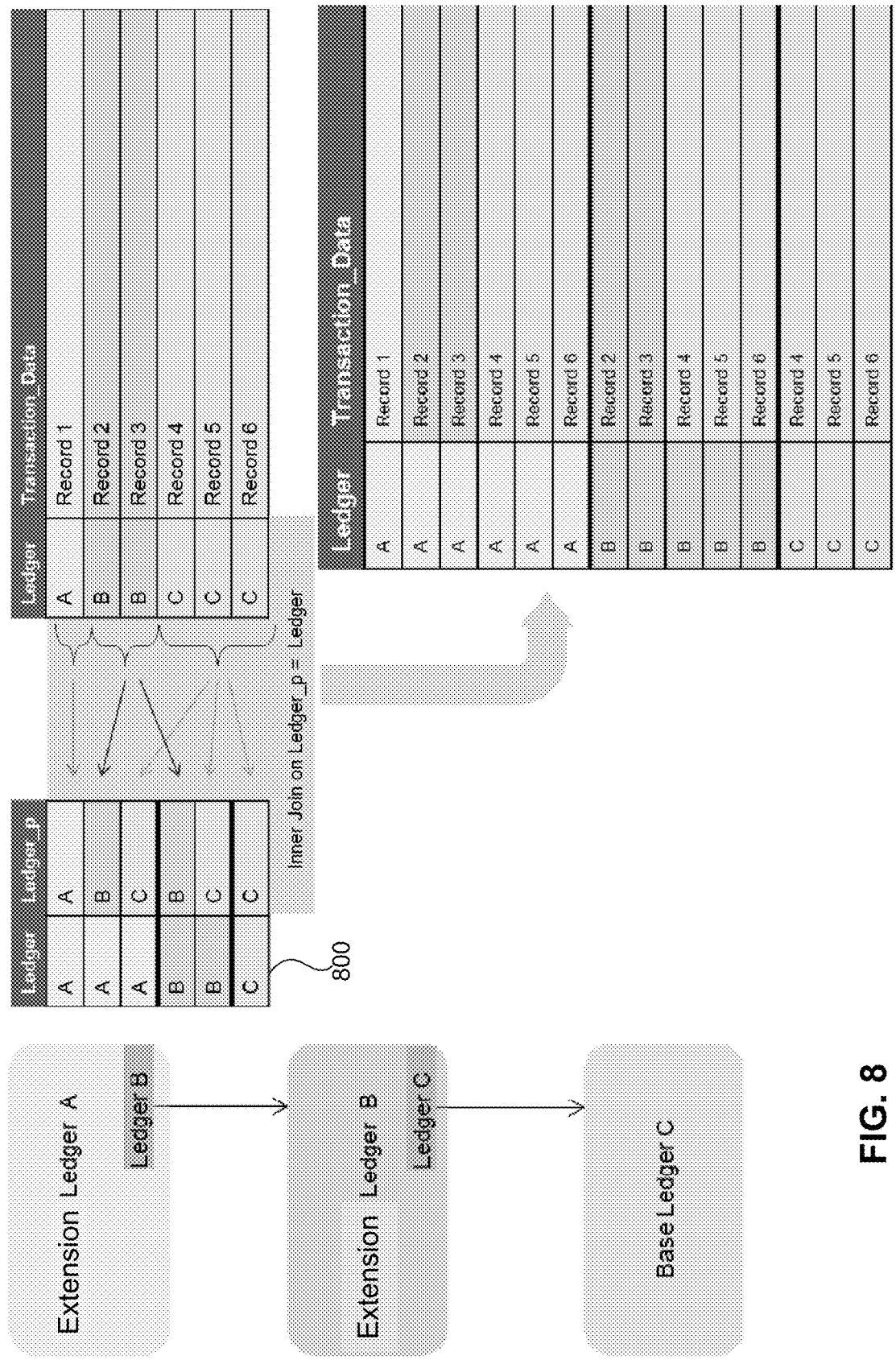
FIG. 8 is a simplified view illustrating implementation of the read access of an extension ledger utilizing a mapping table.

FIG. 8 is a simplified view illustrating implementation of an Extension ledger utilizing a mapping table 800. A simple recursive algorithm is used to set up the mapping table using the content of the ledger master data table shown in FIG. 5. Here, the mapping table can be used to map transaction data (from FIG. 6) of the persisted Ledger (Ledger_p) to the ledger in the selection view (from FIG. 7). In this particular example utilizing the HANA in-memory database available from SAP SE, an inner join on the persisted Ledger_p=Ledger.

Further details regarding the implementation of the extension ledger concept according to various embodiments, are now provided in connection with the following specific examples.

Example 1: Add-on Postings for Different Purposes

The SAP SIMPLE FINANCE software is available from SAP SE of Walldorf, Germany. Financial Accounting modules within this software allow production of legal Financials Statements. In order to ensure compliance, the components obey strict rules.

Customers however, may desire more flexible options, usually driven by internal management requirements. For example, such internal requirements may call for posting in closed periods in order to produce the requested management view.

Another example is that customers may need to adjust the legal view, e.g. in order to reflect a different revenue or cost assignment for a dedicated internal management view. Still another example may call for adjustments for consolidation purposes.

Conventionally, these may be handled in separate components, like special purpose ledger(s). Such components need to be configured and implemented, representing significant additional effort and cost.

Moreover these components usually need to store the data of the Financial Close in a highly redundant manner, because that data is the backbone of any reporting. This duplication increases the memory footprint and leads to reconciliation efforts, both of which contribute to cost.

Figure 9:
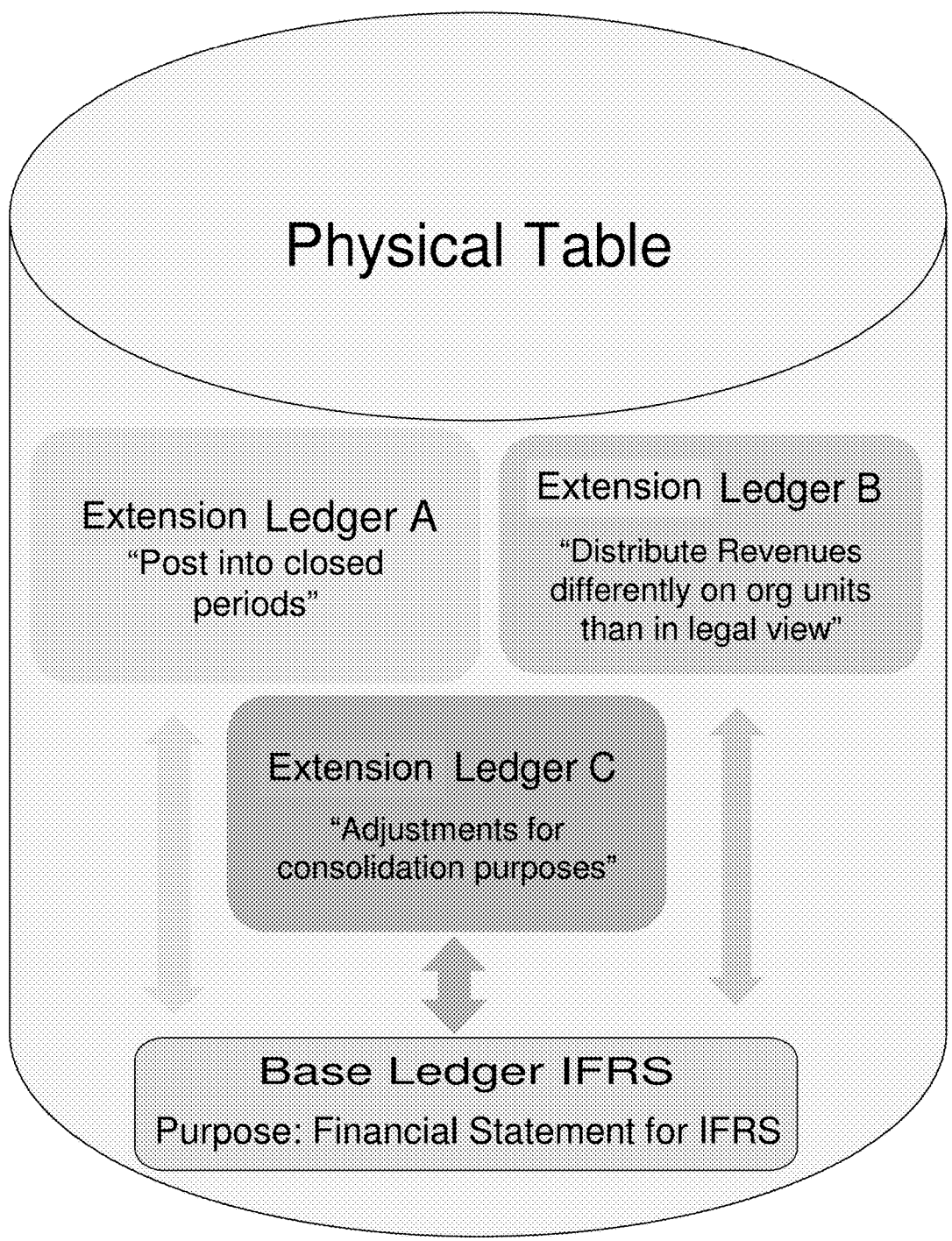
FIG. 9 is a simplified view of an example using multiple extension ledgers suited for particular tasks, pointing to one base ledger.

Accordingly, approaches utilizing extension ledgers according to embodiments, provide the desired flexibility and avoid increasing the memory footprint or aggravating reconciliation efforts. FIG. 9 shows a simplified view of one embodiment wherein several extension ledgers that are suited for particular tasks, point to one base ledger.

Here, the bulk of data resulting from integrated business processes is stored in the base ledger (for example, IFRS data). Only specific adjustments thereto as called for by a particular task, are stored in extension ledgers. This results in one extension ledger for one purpose.

Apart from creating a master record and defining an individual period lock, extension ledgers need no additional configuration. Reporting on the extension ledger always includes the base ledger.

The extension ledger approach according to embodiments is non-redundant. It does not unnecessarily increase the memory footprint and does not need reconciliation.

Several extension ledgers can point to one base ledger. Also, authorization on extension ledger level is easily provided or discarded.

Example 2: Handling Different Accounting Principles in Parallel

Businesses operating internationally, must report their Financial Statement according to the different accounting principles relevant in various jurisdictions. Examples of such accounting principles include but are not limited to US-GAAP, IFRS, and local GAAP.

In one conventional approach data may be stored to fulfill this requirement by defining separate accounts to reflect specifics of IFRS and US-GAAP. In such an approach, reporting must include or exclude specific accounts depending on purpose.

Another conventional approach to address this issue is to store IFRS and US-GAAP as full versions in different areas of the database (i.e., different ledgers). This can result in duplicated effort and increased cost.

Figure 10:
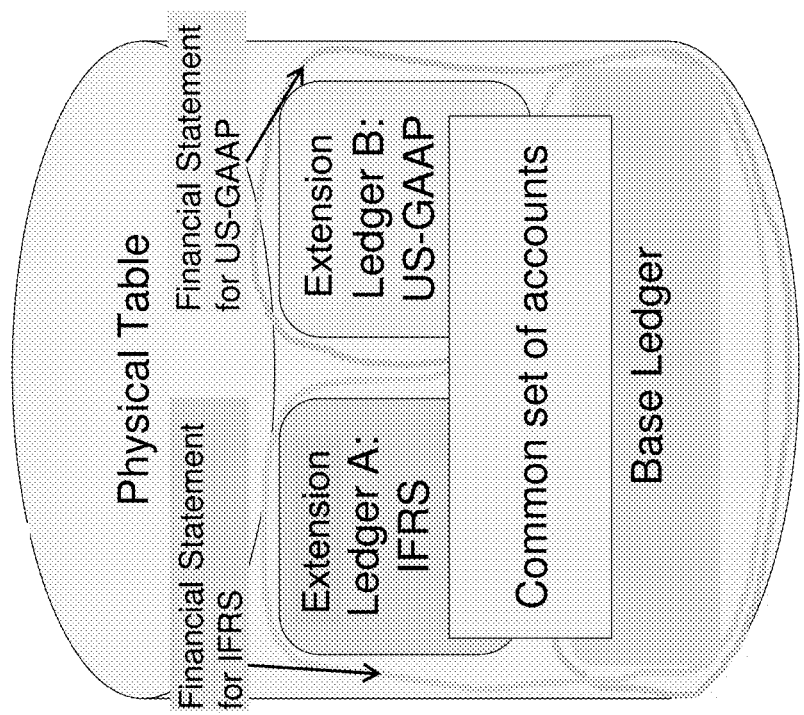
FIG. 10 is a simplified view of an example of an extension ledger approach for data according to different accounting principles.

Accordingly, FIG. 10 is a simplified view illustrating an embodiment utilizing an extension ledger approach, again in the context of the SIMPLE FINANCE software available from SAP SE. Specifically, one Base Ledger is employed for postings where IFRS and US-GAAP do not differ. Individual extension ledgers are used for postings specific to IFRS, and for those specific to US-GAAP.

Memory footprint is optimized in this example. Data is stored exclusively in the Base Ledger, if IFRS and US-GAAP do not differ for a business process. Only if this is not the case, is data stored in each extension ledger separately.

No reconciliation of redundant data needed. Also, ease-of-use for the user is the result. That is, selection of the extension ledger always selects the underlying base ledger as well, since both ledgers together represent the truth.

Definition of reporting structures is straightforward. There is little or no risk of showing wrong data.

From an architectural and maintenance perspective, the extension ledger approach offers a transparent and flexible solution. Authorization on ledger level is easily provided or discarded The extension ledger does not have own configuration (besides that of the ledger master). It inherits from the base ledger.

The ledger entity is already available in many standard SAP user interfaces and reports. Hence, the extension ledger can immediately unfold its power throughout the system.

Figure 11:
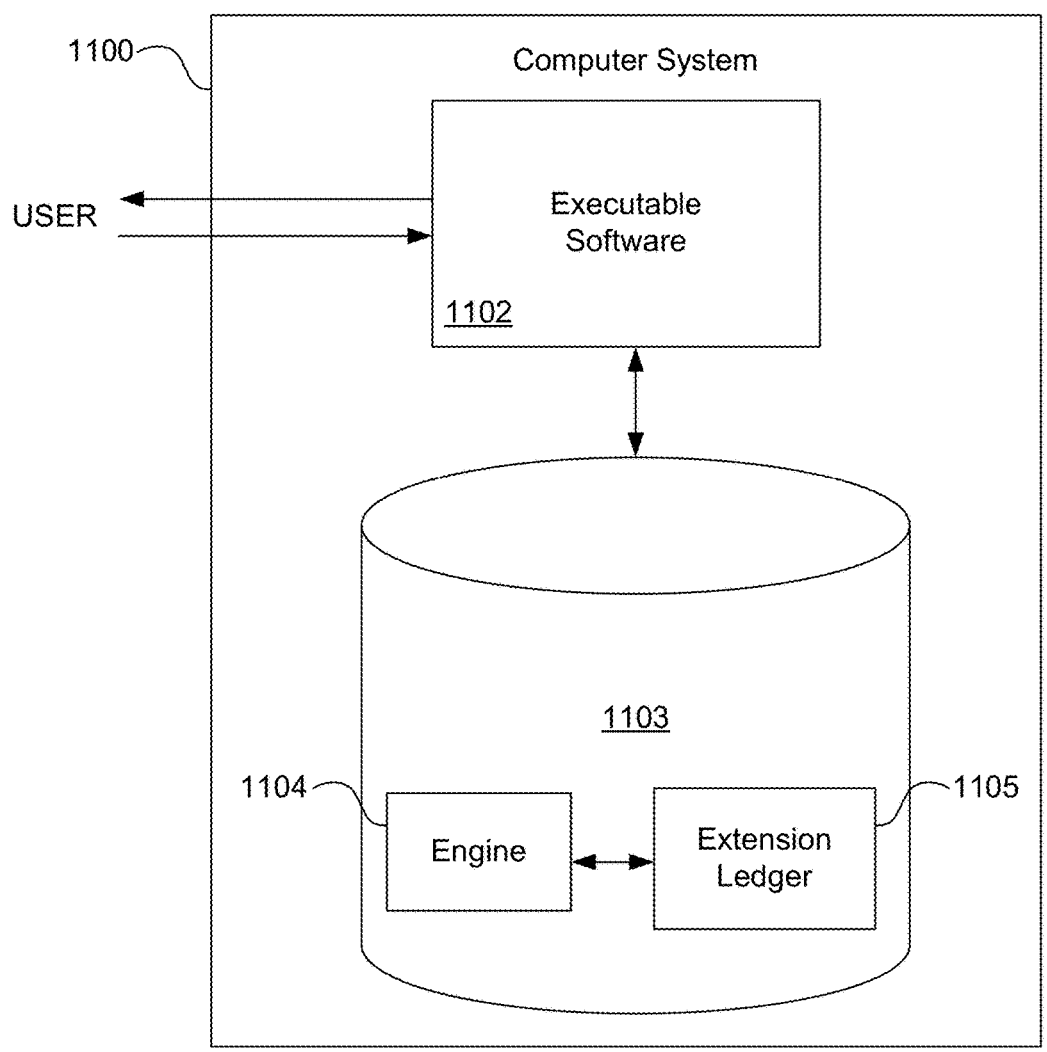
FIG. 11 illustrates hardware of a special purpose computing machine configured to implement an extension ledger according to an embodiment.

FIG. 11 illustrates hardware of a special purpose computing machine configured to implement an extension ledger approach according to an embodiment. In particular, computer system 1101 comprises a processor 1102 that is in electronic communication with a non-transitory computer-readable storage medium 1103. This computer-readable storage medium has stored thereon code 1105 corresponding to an extension ledger. Code 1104 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 11, the engine is shown as being part of the database. Such an embodiment can correspond to applications where processing is performed by a powerful engine available as part of an in-memory database (e.g., the HANA in-memory database available from SAP SE of Walldorf, Germany). However this is not required and in certain embodiments the engine may be implemented in other ways, for example as part of an overlying application layer (of a disk-based database or an in-memory database).

Examples of in memory databases other than the HANA database just mentioned, can include but are not limited to the SYBASE IQ database also available from SAP SE; the Microsoft Embedded SQL for C (ESQL/C) database available from Microsoft Corp. of Redmond, Wash.; and the EXALYTICS In-MEMORY database available from Oracle Corp. of Redwood Shores, Calif.

Figure 12:
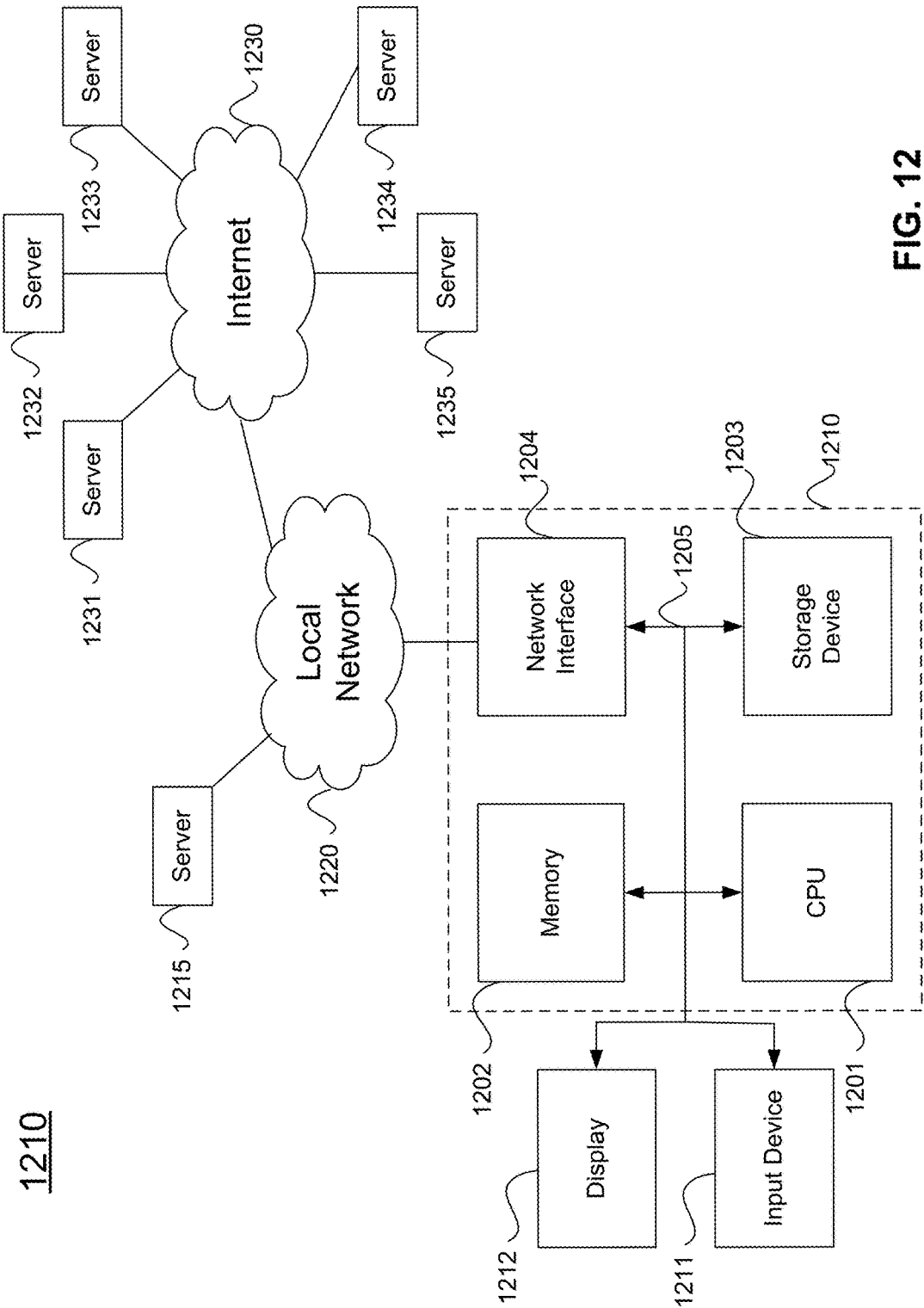
FIG. 12 illustrates an example of a computer system

An example computer system is illustrated in FIG. 12. Computer system 1210 includes a bus 1205 or other communication mechanism for communicating information, and a processor 1201 coupled with bus 1205 for processing information. Computer system 1210 also includes a memory 1202 coupled to bus 1205 for storing information and instructions to be executed by processor 1201, including information and instructions for performing the techniques described above, for example. This memory may also be used for storing variables or other intermediate information during execution of instructions to be executed by processor 1201. Possible implementations of this memory may be, but are not limited to, random access memory (RAM), read only memory (ROM), or both. A storage device 1203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1203 may include source code, binary code, or software files for performing the techniques above, for example. Storage device and memory are both examples of computer readable mediums.

Computer system 1210 may be coupled via bus 1205 to a display 1212, such as a cathode ray tube (CRT) or liquid crystal display (LCD), for displaying information to a computer user. An input device 1211 such as a keyboard and/or mouse is coupled to bus 1205 for communicating information and command selections from the user to processor 1201. The combination of these components allows the user to communicate with the system. In some systems, bus 1205 may be divided into multiple specialized buses.

Computer system 1210 also includes a network interface 1204 coupled with bus 1205. Network interface 1204 may provide two-way data communication between computer system 1210 and the local network 1220. The network interface 1204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1204 sends and receives electrical, electromagnetic, or optical signals that carry digital data streams representing various types of information.

Computer system 1210 can send and receive information, including messages or other interface actions, through the network interface 1204 across a local network 1220, an Intranet, or the Internet 1230. For a local network, computer system 1210 may communicate with a plurality of other computer machines, such as server 1215. Accordingly, computer system 1210 and server computer systems represented by server 1215 may form a cloud computing network, which may be programmed with processes described herein. In the Internet example, software components or services may reside on multiple different computer systems 1210 or servers 1231-1235 across the network. The processes described above may be implemented on one or more servers, for example. A server 1231 may transmit actions or messages from one component, through Internet 1230, local network 1220, and network interface 1204 to a component on computer system 1210. The software components and processes described above may be implemented on any computer system and send and/or receive information across a network, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A computer-implemented method comprising:
receiving generic financial data, first specific financial data associated with the generic financial data, and second specific financial data associated with the generic financial data;
writing the generic financial data to a base ledger stored in an in-memory database in communication with an application layer;
writing the first specific financial data to a first extension ledger stored in the in-memory database, and writing the second specific financial data to a second extension ledger stored in the in-memory database, the first extension ledger and the second extension ledger linked to the base ledger according to a mapping table;
evaluating a chain of ledgers comprising the base ledger and the first extension ledger according to a recursive algorithm processed by an in-memory database engine of the in-memory database;
referencing the mapping table to read from the first extension ledger, a first report comprising the generic financial data and the first specific financial data; and
referencing the mapping table to read from the second extension ledger, a second report comprising the generic financial data and the second specific financial data, without reconciliation between the first extension ledger and the second extension ledger.

2. A method as in claim 1 wherein:
the first specific financial data is associated with the generic financial data according to a first accounting principle; and
the second specific financial data is associated with the generic financial data according to a second accounting principle.

3. A method as in claim 2 wherein the first accounting principle comprises GAAP, and the second accounting principle comprises other than GAAP.

4. A method as in claim 1 wherein at least one of the first specific financial data and the second specific financial data are derived from the generic financial data.

5. A method as in claim 1 wherein the mapping table is stored in the in-memory database.

6. A method as in claim 1 wherein the mapping table is stored in the application layer.

7. A method as in claim 1 wherein reading from the first extension ledger comprises a join operation.

8. A non-transitory computer readable storage medium embodying a computer program for performing a method, said method comprising:
receiving generic financial data, first specific financial data associated with the generic financial data, and second specific financial data associated with the generic financial data;
writing the generic financial data to a base ledger of a database;
writing the first specific financial data to a first extension ledger of the database, and writing the second specific financial data to a second extension ledger of the database, the first extension ledger and the second extension ledger linked to the base ledger according to a mapping table of the database;
evaluating a chain of ledgers comprising the base ledger and the first extension ledger according to a recursive algorithm processed by an in-memory database engine of the in-memory database;
referencing the mapping table to read from the first extension ledger, a first report comprising the generic financial data and the first specific financial data; and
referencing the mapping table to read from the second extension ledger, a second report comprising the generic financial data and the second specific financial data, without reconciliation between the first extension ledger and the second extension ledger.

9. A non-transitory computer readable storage medium as in claim 8 wherein reading the first extension ledger comprises a join operation.

10. A non-transitory computer readable storage medium as in claim 8 wherein:

the first specific financial data is associated with the generic financial data according to a first accounting principle; and the second specific financial data is associated with the generic financial data according to a second accounting principle.

11. A non-transitory computer readable storage medium as in claim 8 wherein at least one of the first specific financial data and the second specific financial data are derived from the generic financial data.

12. A computer system comprising:

one or more processors;

a software program, executable on said computer system, the software program configured to cause an in-memory database engine to:

receive generic financial data, first specific financial data associated with the generic financial data, and second specific financial data associated with the generic financial data;

write the generic financial data to a base ledger of an in-memory database;

write the first specific financial data to a first extension ledger of the in-memory database, and write the second specific financial data to a second extension ledger of the in-memory database, the first extension ledger and the second extension ledger linked to the base ledger according to a mapping table of the in-memory database;

reference the mapping table to read from the first extension ledger, a first report comprising the generic financial data and the first specific financial data;

evaluate a chain of ledgers comprising the base ledger and the first extension ledger, according to a recursive algorithm; and reference the mapping table to read from the second extension ledger, a second report comprising the generic financial data and the second specific financial data, without reconciliation between the first extension ledger and the second extension ledger.

13. A computer system as in claim 12 wherein reading the first extension ledger comprises a join operation.

14. A computer system as in claim 12 wherein at least one of the first specific financial data and the second specific financial data are derived from the generic financial data.

15. A computer system as in claim 12 wherein:

the first specific financial data is associated with the generic financial data according to a first accounting principle; and the second specific financial data is associated with the generic financial data according to a second accounting principle.

16. A computer system as in claim 12 wherein according to the recursive algorithm a final select to a particular ledger comprises an in clause containing a list of underlying ledgers in the chain.

17. A method as in claim 1 wherein according to the recursive algorithm a final select to a particular ledger comprises an in clause containing a list of underlying ledgers in the chain.

18. A non-transitory computer readable storage medium as in claim 9 wherein according to the recursive algorithm a final select to a particular ledger comprises an in clause containing a list of underlying ledgers in the chain.

* * * * *